United States Patent
Henz et al.

(10) Patent No.: US 7,046,776 B1
(45) Date of Patent: May 16, 2006

(54) METHOD FOR CONVERTING A THREE-PARTY TELECOMMUNICATIONS CONNECTION WHICH IS SWITCHED VIA THE PUBLIC COMMUNICATIONS NETWORK INTO A TWO-PARTY TELECOMMUNICATIONS CONNECTION

(75) Inventors: Volker Henz, Oberschleissheim (DE); Bernhard Krembs, Grünwald (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,532

(22) PCT Filed: May 12, 2000

(86) PCT No.: PCT/DE00/01505

§ 371 (c)(1),
(2), (4) Date: Nov. 19, 2001

(87) PCT Pub. No.: WO00/70852

PCT Pub. Date: Nov. 23, 2000

(30) Foreign Application Priority Data

May 17, 1999 (DE) ............................... 199 22 554

(51) Int. Cl.
*H04M 15/00* (2006.01)

(52) U.S. Cl. ............................ 379/114.02; 379/112.05; 379/114.12; 379/114.21

(58) Field of Classification Search ........... 379/112.05, 379/114.01, 114.12, 114.21, 114.02
See application file for complete search history.

(56) References Cited

U.S. PATENT DOCUMENTS

| | | | |
|---|---|---|---|
| 4,723,272 A | | 2/1988 | Maat |
| 5,432,845 A | | 7/1995 | Burd et al. |
| 5,590,186 A | | 12/1996 | Liao et al. |
| 5,617,471 A | * | 4/1997 | Rogers et al. ......... 379/212.01 |
| 5,825,858 A | * | 10/1998 | Shaffer et al. .............. 379/120 |
| 6,307,924 B1 | * | 10/2001 | Rosenberg ............. 379/115.01 |
| 6,496,579 B1 | * | 12/2002 | Mashinsky ............. 379/220.01 |
| 6,535,730 B1 | * | 3/2003 | Chow et al. ................. 455/416 |
| 6,611,585 B1 | * | 8/2003 | Carrion et al. ......... 379/212.01 |
| 6,614,897 B1 | * | 9/2003 | Curtis et al. ........... 379/210.01 |

FOREIGN PATENT DOCUMENTS

DE 196 53 622 A1 7/1998

* cited by examiner

*Primary Examiner*—Barry Taylor
(74) *Attorney, Agent, or Firm*—Bell, Boyd & Lloyd, LLC

(57) ABSTRACT

A method for converting a three-party telecommunications connection which is switched via the public communications network into a two-party telecommunications connection wherein, after the telecommunications switching office (VST B), via which a three-party telecommunications connection between two subscriber lines and a further subscriber line or between two subscriber lines and an operator's position is routed, has received a request from the further subscriber line or the operator's position, a new direct telecommunications connection is set up between the two subscriber lines and the existing sections of the three-party telecommunications connection between these two subscriber lines and the further subscriber line or the operator's position are released.

4 Claims, 1 Drawing Sheet

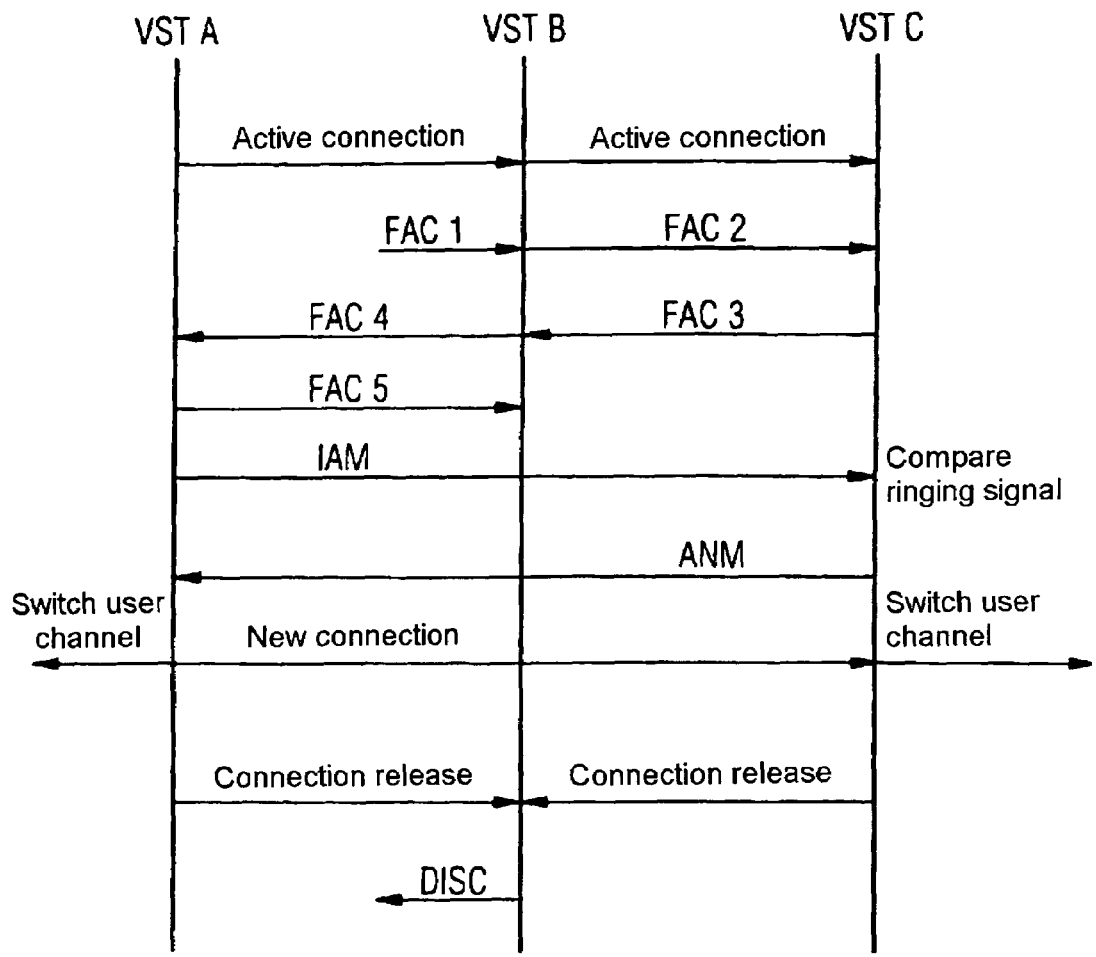

METHOD FOR CONVERTING A THREE-PARTY TELECOMMUNICATIONS CONNECTION WHICH IS SWITCHED VIA THE PUBLIC COMMUNICATIONS NETWORK INTO A TWO-PARTY TELECOMMUNICATIONS CONNECTION

BACKGROUND OF THE INVENTION

The present invention relates to a method for converting a three-party telecommunications connection, which is switched via a public communications network, between two subscriber lines and a further subscriber line or between two subscriber lines and an operator's position, into a two-party telecommunications connection between the two subscriber lines. The three-party telecommunications connection is routed here via the telecommunications switching office to which the further subscriber line or the operator's position is connected.

The conversion of a three-party telecommunications connection into a two-party telecommunications connection is carried out in a known fashion by releasing the section of the three-party telecommunications connection between the further subscriber line or the operator's position and its telecommunications switching office. The known method is applied, for example, in the case in which a subscriber of the telecommunications network, for example a customer of a bank, wishes to set up a connection to an employee of a bank at a bank branch. The connection setup to the employee of the bank is processed, for example, as follows:

The customer of the bank sets up a connection from his/her subscriber terminal to his/her local switching office; for example in Munich. From this local switching office, a connection is switched to a further telecommunications switching office, for example in Hamburg, on the basis of a call divert which is set up in the local switching office, wherein a number of operators' positions, for example of a call center, are connected to the further telecommunications switching office. The connection is finally switched from the telecommunications switching office in Hamburg to an operator's position.

A switching operator at the operator's position then searches for the call number of the employee of the bank requested by the customer of the bank and initiates a connection setup from the telecommunications switching office in Hamburg to the same local switching office in Munich or to another local switching office to which the individual subscriber lines of the employees of the bank are connected. From this local switching office, the connection is finally switched through to the requested employee of the bank. After a successful connection setup from the customer of the bank to the requested employee of the bank, the switching operator brings about the conversion into a two-party telecommunications connection, wherein the operator's position is released from the connection.

The known method is also applied to the case of a multiparty service. For this purpose, the customer of the bank calls, for example, an employee of the bank at a banking service center in Hamburg. This employee of the bank then establishes a three-party multiparty service connection to a further employee of a bank branch; for example, in Munich. After a certain period of time during the call, the employee of the banking service center is released from the three-party multi-party service connection, and in his/her local switching office in Hamburg brings about the interconnection of the section of the connection between the customer of the bank and the telecommunications switching office in Hamburg and the section of the connection between the telecommunications switching office in Hamburg and the employee of the bank branch in Munich. In this way, a two-party connection is maintained between the customer of the bank and the employee of the bank branch in Munich.

In the known method, there is, however, the disadvantage for the bank that when there is a call divert to an operator's station, for example in Hamburg, the bank has to pay for the existing telecommunications connection between the local switching office in Munich and the telecommunications switching office in Hamburg despite the fact that once the operator's position has been released from the three-party connection there is then only a call connection to the employee at the Munich branch of the bank. If there is a call transfer by the employee of the banking service center, the customer of the bank has to pay the tolls for the long-distance connections between his/her local switching office and the telecommunications switching office in Hamburg as well as between the remote switching office in Hamburg and the local switching office, for example in Munich, which is responsible for the bank branch.

Furthermore, additional resources, for example in the form of channel assignments on the connection lines and/or for the switching operation, in the telecommunications switching office itself are used up for the long-distance connections via the telecommunications switching office in Hamburg.

A method for carrying out a connection setup for a call diversion or connection forwarding in a communications network is already known (DE 196 53 622 A1). Here, when there is a call from a subscriber's station of a first communications system to a subscriber's station which is assigned to a second communications system and for which a call diversion or at which a call forwarding to a subscriber's station of a third communications system is set up or brought about, a connection to the third communications system is first set up via the second communications system. An equivalent path inquiry is then transmitted from this third communications system to the calling, first communications system, in response to which the first communications system determines an alternative connection path (bypassing the second communications system) and causes the third communications system to change over to the alternative connection path. However, such a procedure is not readily suitable for converting the three-party telecommunications connection described above into a two-party telecommunications connection.

An object of the present invention is, therefore, to configure a method of the type mentioned at the beginning to the effect that the disadvantages explained above are eliminated.

SUMMARY OF THE INVENTION

The principle of the present invention consists in the fact that the telecommunications switching office via which the three-party telecommunications connection between the two subscriber lines, for example the subscriber line of the customer of the bank mentioned at the beginning and the subscriber line of the employee of the bank mentioned at the beginning in the bank branch, and a further subscriber line, for example of the employee of the bank in the banking service center, or an operator's position, for example of a call center, is set up, receives a request from the further subscriber line or from the operator's position and in response initiates the setting up of a new direct telecommunications connection between the two aforesaid subscriber lines (for example, customer of a bank and employee of a bank in the bank branch). This is done by virtue of the fact that the telecommunications switching office which is connected to the further subscriber line or the operator's position requests the one switching office, or one of the two switching offices, to which the two aforesaid subscriber lines are connected to set up the new telecommunications connection in accordance with a selection which is made as a function of the tariff model which forms the basis of the billing system. Furthermore, after the direct telecommunications connection has been successfully set up, the existing sections of the three-party telecommunications connection between these two subscriber lines and the further subscriber line, or the operator's position, are released. In this way, the subscribers can determine whether the originally calling subscriber pays the tolls for the new direct subscriber connection or whether the originally called subscriber pays the tolls for the new direct telecommunications connection which is then set up from his/her telecommunications switching office.

Accordingly, a saving is made in resources, for example in the form of channel assignments upon transmission lines and/or for switching operations, in the telecommunications switching office to which the further subscriber or the operator's position is connected.

For the subscriber, for example the bank mentioned at the beginning, which makes use of the switching service via an operator's position, for example a call center, and for the calling subscriber in the case of the aforesaid three-party multiparty service connection, there is the welcome benefit that after the conversion of the three-party telecommunications connection into the two-party telecommunications connection both of them only have to pay the tolls for the direct telecommunications connection to the called subscriber.

One embodiment of the present invention discloses an alternative insofar as the two subscriber lines between which a new direct telecommunications connection is set up are connected to a common telecommunications switching office. Here, the new direct telecommunications connection must merely be switched in the common telecommunications switching office. Moreover, the calling subscriber, or the subscriber making use of the switching service, only pays tolls at the local rate in this case.

According to another embodiment of the present invention, the telecommunications switching office which is requested to set up the new telecommunications connection receives a uniquely defined ringing signal and/or the call number of the second subscriber line from the telecommunications switching office which accepts the new telecommunications connection and to which the second called subscriber line of the two aforesaid subscriber lines is connected. The new direct telecommunications connection is thus uniquely identified before the connection setup, as a result of which a correct useful channel switch-over is also ensured in the telecommunications switching office which initiates the new telecommunications connection and in the telecommunications switching office which accepts the new telecommunications connection. Moreover, this permits the correct call number of the called subscriber of the two-party telecommunications connection to be indicated in the subscriber terminal of the calling subscriber.

Additional features and advantages of the present invention are described in, and will be apparent from, the following Detailed Description of the Invention and the Figures.

BRIEF DESCRIPTION OF THE FIGURES

FIG. 1 shows an exemplary flow chart relating to the method according to the present invention, in which is illustrated a telecommunications switching office VST A, a telecommunications switching office VST B and a telecommunications switching office VST C.

DETAILED DESCRIPTION OF THE INVENTION

The subscriber line of the calling subscriber, for example of the customer of a bank, is to be imagined as being connected to the telecommunications switching office VST A, and the subscriber line of the called subscriber, for example of the employee of the bank branch, is to be imagined as being connected to the telecommunications switching office VST C. A further subscriber line of a subscriber, for example of the employee of the bank in the banking service center, or an operator's position, for example of a call center, are also to be imagined as being connected to the telecommunications switching office VST B.

It will be assumed that there is an active three-party telecommunications connection between the subscriber line of the telecommunications switching office VST A, the subscriber line or the operator's position of the telecommunications switching office VST B and the subscriber line of the telecommunications switching office VST C. The feature of the conversion of the three-party telecommunications connection into a two-party telecommunications connection is then activated via a message FAC1 (FAC=feature activation) in the switching office VST B. The telecommunications switching office VST B then informs the telecommunications switching office VST C, via the message FAC2, that the conversion of the three-party telecommunications connection has been activated. In this case, the subscriber whose subscriber line is connected to the telecommunications switching office VST A pays the toll for the direct telecommunications connection which is to be newly set up between the telecommunications switching offices VST A and VST C.

If the subscriber whose subscriber line is connected to the telecommunications switching office VST C is to pay the toll, the telecommunications switching office VST A can be informed about the conversion via the message FAC2. The following sequence of the method according to the present invention is then to be imagined as if the references VST A and VST C were interchanged in FIG. 1.

The telecommunications switching office VST C transmits, in the message FAC3, a uniquely defined ringing signal, together with the call number of the subscriber line connected to it, to the telecommunications switching office VST B which forwards to the telecommunications switching office VST A a request message FAC4 to set up a new direct telecommunications connection by reference to the transferred call number relating to the telecommunications switching office VST C, the request message FAC4 containing the ringing signal and the call number. The receipt of the message FAC4 is confirmed by the telecommunications switching office VST A by the message FAC5 to the telecommunications switching office VST B. The setup of the new telecommunications connection is signaled to the telecommunications switching office VST C via the message IAM (Initial Address Message). This message also contains the ringing signal allocated by the telecommunications switching office VST C. In the telecommunications switching office VST C, the ringing signal transferred in the message LAM is now compared with the ringing signals of all the connections which have been activated in the telecommunications switching office VST C. After the section of the connection between the telecommunications switching office VST B and the subscriber line or operator's position connected to the telecommunications switching office VST C has been determined, the telecommunications switching office VST C responds with the message ANM (Answer Message) to the telecommunications switching office VST A.

If the telecommunications switching office VST C was not able to find a connection with an identical ringing signal, the procedure for setting up the new direct telecommunications connection to the telecommunications switching office VST C is aborted.

As soon as the telecommunications switching office VST A has received the message ANM, the new direct telecommunications connection is switched through to the telecommunications switching office VST C. At the same time, the user channel of the active section of the connection between the subscriber line connected to the telecommunications switching office VST A and the telecommunications switching office VST A, and the user channel of the active section of the connection between the subscriber line connected to the telecommunications switching office VST C and the telecommunications switching office VST C are respectively connected to the user channel of the newly set-up telecommunications connection. The section of the connection to the telecommunications switching office VST B is then released from the telecommunications switching office VST A, and the section of the connection to the telecommunications switching office VST B is then released from the telecommunications switching office VST C, and the assigned resources are thus made available. The release of the section of the connection between the telecommunications switching office VST B and the subscriber line connected to this telecommunications switching office is then also initiated via the message DISC.

If the setup of the new direct telecommunications connection fails in the method owing to a fault, the existing sections of the connections between the telecommunications switching office VST A and the telecommunications switching office VST B as well as those between the telecommunications switching office VST B and the telecommunications switching office VST C are maintained, connected together in the telecommunications switching office VST B and only the section of the connection between the telecommunications switching office VST B and its subscriber line is released.

If the telecommunications switching offices VST A and VST C are combined in one telecommunications switching office, the method operates similarly to the manner described above. The connection setup of the new direct telecommunications connection is then not carried out between the telecommunications switching offices VST A and VST C but rather processed internally in the single telecommunications switching office and the user channels of the sections of the connections to the two subscriber lines connected to this telecommunications switching office are connected together internally.

Although the present invention has been described with reference to specific embodiments, those of skill in the art will recognize that changes may be made thereto without departing from the spirit and scope of the invention as set forth in the hereafter appended claims.

The invention claimed is:

1. A method for converting a three-party telecommunications connection, which is switched via a public communications network, between two subscriber lines and one of a further subscriber line and an operator's position, the three-party telecommunications connection being routed via a telecommunications switching office to which the one of the further subscriber line and the operator's position is connected, into a two-party telecommunications connection between the two subscriber lines, the method comprising the steps of:

initiating setup, via the telecommunications switching office, and after reception of a request originating from the one of the further subscriber line and the operator's position, of a new direct telecommunications connection between the two subscriber lines, wherein the telecommunications switching office requests one of two further telecommunications switching offices to which the two subscriber lines are respectively connected to set up the new telecommunications connection in accordance with a selection which is made as a function of a tariff model which forms a basis of a billing system; and releasing, after a successful setup of the direct telecommunications connection, existing sections of the three-party telecommunications connection which is routed via the telecommunications switching office, between the two subscriber lines and the one of the further subscriber line and the operator's position.

2. A method for converting a three-party telecommunications connection as claimed in claim 1, the method further comprising the step of:

connecting the two subscriber lines, between which the new direct telecommunications connection is set up, to a common telecommunications switching office.

3. A method for converting a three-party telecommunications connection as claimed in claim 1, the method further comprising the step of:

receiving, via the telecommunications switching office which is requested to set up the new telecommunications connection, at least one of a uniquely defined ringing signal and a call number of the second subscriber line from the telecommunications switching office which accepts the new telecommunications connection and to which the second subscriber line of the two subscriber lines is connected.

4. A method for converting a three-party telecommunications connection, which is switched via a public communications network, between two subscriber lines and one of a further subscriber line and an operator's position, comprising:

routing the three-party telecommunications connection via a telecommunications switching office to which the one of the further subscriber line and the operator's position is connected;

initiating setup, via the telecommunications switching office, and after reception of a request originating from the one of the further subscriber line and the operator's position, of a new direct telecommunications connection between the two subscriber lines, wherein the telecommunications switching office requests one of two further telecommunications switching offices to which the two subscriber lines are respectively connected to set up the new telecommunications connection in accordance with a selection which is made as a function of a tariff model which forms a basis of a billing system; and releasing, after a successful setup of the direct telecommunications connection, existing sections of the three-party telecommunications connection which is routed via the telecommunications switching office, between the two subscriber lines and the one of the further subscriber line and the operator's position, to establish a two-party telecommunications connection between the two subscriber lines.

* * * * *